United States Patent
Patel et al.

(10) Patent No.: US 12,204,532 B2
(45) Date of Patent: Jan. 21, 2025

(54) PARAMETERIZED NARRATIONS FOR DATA ANALYTICS SYSTEMS

(71) Applicant: DataChat.ai, Madison, WI (US)

(72) Inventors: Jignesh Patel, Madison, WI (US); Robert Konrad Claus, Madison, WI (US); Amos Kendall, Madison, WI (US); Rogers Jeffrey Leo John, Middleton, WI (US); Ushmal Ramesh, Madison, WI (US); Jiatong Li, Madison, WI (US)

(73) Assignee: DataChat.ai, Madison, WI (US)

( * ) Notice: Subject to any disclaimer, the term of this patent is extended or adjusted under 35 U.S.C. 154(b) by 404 days.

(21) Appl. No.: 17/643,462

(22) Filed: Dec. 9, 2021

(65) Prior Publication Data

US 2023/0185798 A1 Jun. 15, 2023

(51) Int. Cl.
*G06F 16/2452* (2019.01)
*G06F 16/242* (2019.01)
(Continued)

(52) U.S. Cl.
CPC .... *G06F 16/24522* (2019.01); *G06F 16/2425* (2019.01); *G06F 40/211* (2020.01); *G06F 40/40* (2020.01)

(58) Field of Classification Search
USPC ................................................ 704/7–10, 257
See application file for complete search history.

(56) References Cited

U.S. PATENT DOCUMENTS

| 5,682,539 | A | 10/1997 | Conrad et al. |
| 9,009,030 | B2 | 4/2015 | Wang et al. |

(Continued)

FOREIGN PATENT DOCUMENTS

| JP | 2007514991 A | 6/2007 |
| JP | 2014505939 A | 3/2014 |

(Continued)

OTHER PUBLICATIONS

"Deep structure and surface structure", wikipedia.org, Retrieved from https://en.wikipedia.org/w/index.php?title=Deep_structure_and_surface_structure&oldid=1003034538, Accessed on Mar. 10, 2023, 3 pp.

(Continued)

*Primary Examiner* — Leonard Saint-Cyr
(74) *Attorney, Agent, or Firm* — Shumaker & Sieffert, P.A.

(57) ABSTRACT

A device configured to perform data analytics comprising a memory and a processor may be configured to perform the techniques described in this disclosure. The memory may store multi-dimensional data. The processor may receive a sequence of inputs defining a recipe for analyzing the multi-dimensional data according to a language sub-surface specifying a natural language containment hierarchy defining a grammar for a natural language as a hierarchical arrangement of a plurality of language sub-surfaces. The processor may also receive data indicative of a summarized narration of the recipe and parameterize a field of the summarized narration to insert a user adjustable parameter that enables manipulation of the underlying recipe and obtain a parameterized summary that includes the user adjustable parameter. The processor may next present, via a first user interface, the parameterized summary.

15 Claims, 7 Drawing Sheets

(51) Int. Cl.
*G06F 40/211* (2020.01)
*G06F 40/40* (2020.01)

(56) References Cited

U.S. PATENT DOCUMENTS

| | | | |
|---|---|---|---|
| 9,665,662 | B1 | 5/2017 | Gautam et al. |
| 11,157,704 | B2 | 10/2021 | Patel et al. |
| 2005/0091036 | A1 | 4/2005 | Shackleton et al. |
| 2005/0273336 | A1 | 12/2005 | Chang et al. |
| 2008/0162098 | A1* | 7/2008 | Suarez-Rivera ....... G01V 11/00 703/10 |
| 2009/0119095 | A1 | 5/2009 | Beggelman et al. |
| 2011/0072392 | A1* | 3/2011 | Shih ................. G06F 16/283 715/811 |
| 2011/0119047 | A1 | 5/2011 | Ylonen |
| 2012/0016678 | A1 | 1/2012 | Gruber et al. |
| 2012/0065960 | A1 | 3/2012 | Iwama et al. |
| 2013/0332481 | A1 | 12/2013 | Lau et al. |
| 2015/0331850 | A1 | 11/2015 | Ramish |
| 2015/0339376 | A1 | 11/2015 | Wieweg et al. |
| 2016/0162473 | A1 | 6/2016 | Cogley et al. |
| 2016/0179934 | A1 | 6/2016 | Stubley et al. |
| 2017/0116982 | A1 | 4/2017 | Gelfenbeyn et al. |
| 2017/0293607 | A1* | 10/2017 | Kolotienko ........... G06F 40/226 |
| 2017/0293687 | A1* | 10/2017 | Kolotienko ............ G06F 40/30 |
| 2019/0179648 | A1 | 6/2019 | Kevorkian |

FOREIGN PATENT DOCUMENTS

| | | |
|---|---|---|
| JP | 2014528134 A | 10/2014 |
| JP | 2017138954 A | 8/2017 |
| WO | 2005041033 A2 | 5/2005 |
| WO | 2018009369 A1 | 1/2018 |

OTHER PUBLICATIONS

International Search Report and Written Opinion of International Application No. PCT/US2022/080748 dated Mar. 22, 2023, 9 pp.
Richardson, John H. "AI Chatbots Try to Schedule Meetings without Enraging US" Wired.com, available at https://www.wired.com/story/xai-meeting-ai-chatbot/ (last accessed Jun. 13, 2019), May 24, 2018, 9 pp.
Whitty, Robin "The Chomsky Hierarchy" London South Bank University, Touring Turing, Rewley House, Jul. 2012, 13 pp.
Anonymous: "Deep structure and surface structure—Wikipedia", Dec. 12, 2022, pp. 1-3, XP093030632, Retrieved from the Internet: URL:https://en.wikipedia.org/wiki/Deep_structure_and_surface_structure.
International Preliminary Report on Patentability from International Application No. PCT/US2022/080748 dated Jun. 20, 2024, 6 pp.

* cited by examiner

PARAMETERIZED NARRATIONS FOR DATA ANALYTICS SYSTEMS

TECHNICAL FIELD

This disclosure relates to computing and data analytics systems, and more specifically, parameterized narrations for data analytics systems.

BACKGROUND

Data analytics systems are increasingly using natural language processing to facilitate interactions by users who are unaccustomed to formal, or in other words, structured database languages. Natural language processing generally refers to a technical field in which computing devices process user inputs provided by users via conversational interactions using human languages. For example, a device may prompt a user for various inputs, present clarifying questions, present follow-up questions, or otherwise interact with the user in a conversational manner to elicit the input (e.g., similar to a so-called "chatbot"). The user may likewise enter the inputs as sentences or even fragments, thereby establishing a simulated dialog with the device to specify one or more intents (which may also be referred to as "tasks") to be performed by the device.

Natural language processing may allow users unaccustomed with formal (or in other words, structured) database languages (such as a structured query language—SQL, or other structured database languages) to perform data analytics without having a deep knowledge of such formal database languages. While natural language processing may facilitate such data analytics by users unaccustomed with formal database languages, the user interface associated with natural language processing may, in some instances, be cluttered and difficult to understand due to the conversational nature of natural language processing. Moreover, the conversation resulting from natural language processing may distract certain users from the underlying data analytics result, thereby possibly detracting from the benefits of natural language processing in the context of data analytics.

In addition, while natural language processing may allow users unaccustomed with structured database languages, natural language processing may still require complicated phrasings (which may also be referred to as "utterances") to produce various data analytic results. Such complicated phrasings are difficult to learn and may not produce the desired results when improperly entered, thereby again detracting from the benefits of natural language processing in the context of data analytics.

SUMMARY

In general, this disclosure describes techniques for parameterized narrations for data analytic systems. Rather than resort to repeatedly editing complicated sequences of phrasings entered using natural language, various aspects of the techniques described in this disclosure may enable a computing device to obtain a summary (or other high level narration) that distills the sequence of phrasings (which may be referred to as a recipe) into a simplified narration. The computing device may then parameterize a field (possibly at user direction) of the summarized narration to insert a user adjustable parameter that enables manipulation of the underlying recipe.

The user may then interact with the parameterized summary to quickly understand the underlying recipe while also adapting the user adjustable parameter to accommodate changes to data analysis over time with regard to the recipe, potentially avoiding having to reenter the recipe. Moreover, the user may share the recipe (via interactions with the computing device) within business units, across business units, within an entire organization, etc. via the parameterized summary, allowing users unfamiliar with recipe construction to quickly adapt the underlying recipe, via the user adjustable parameter of the parameterized summary, to accommodate the data analysis needs of each individual user.

In this respect, various aspect of the techniques described in this disclosure may facilitate access to data analysis without requiring a comprehensive understanding of formal database query languages or even recipe construction. Moreover, the techniques may enable users to individually adapt such recipes via the user adjustable parameters of the parameterized summary without having to reenter or even understand the recipe itself. In this way, various aspects of the techniques may improve the user experience in performing data analytics with respect to large multi-dimensional datasets.

As such, various aspects of the techniques may improve operation of the underlying computing devices themselves in terms of avoiding redundant entry of recipes by unexperienced users that can often result in errors or incorrect results that would otherwise consume computing resources (e.g., processor cycles, memory, memory bus bandwidth, and associated power). In this way, users may quickly reuse and adapt existing recipes while maintaining a high level understanding of the underlying recipe via the parameterized summary, thereby facilitating more efficient operation (in terms of the above noted computing resources) of the computing devices themselves.

In one aspect, the techniques are directed to a device configured to perform data analytics, the device comprising: a memory configured to store multi-dimensional data; and one or more processors configured to: receive a sequence of inputs defining a recipe for analyzing the multi-dimensional data according to a language sub-surface specifying a natural language containment hierarchy defining a grammar for a natural language as a hierarchical arrangement of a plurality of language sub-surfaces; receive data indicative of a summarized narration of the recipe; parameterize a field of the summarized narration to insert a user adjustable parameter that enables manipulation of the underlying recipe and obtain a parameterized summary that includes the user adjustable parameter; and present, via a first user interface, the parameterized summary.

In another aspect, the techniques are directed to a method for performing data analytics, the method comprising: receiving a sequence of inputs defining a recipe for analyzing the multi-dimensional data according to a language sub-surface specifying a natural language containment hierarchy defining a grammar for a natural language as a hierarchical arrangement of a plurality of language sub-surfaces; receiving data indicative of a summarized narration of the recipe; parameterizing a field of the summarized narration to insert a user adjustable parameter that enables manipulation of the underlying recipe and obtain a parameterized summary that includes the user adjustable parameter; and presenting, via a first user interface, the parameterized summary.

In another aspect, the techniques are directed to a non-transitory computer-readable storage medium having instructions stored thereon that, when executed, cause one or more processors to: receive a sequence of inputs defining a recipe for analyzing the multi-dimensional data according to a language sub-surface specifying a natural language containment hierarchy defining a grammar for a natural language as a hierarchical arrangement of a plurality of language sub-surfaces; receive data indicative of a summarized narration of the recipe; parameterize a field of the summarized narration to insert a user adjustable parameter that enables manipulation of the underlying recipe and obtain a parameterized summary that includes the user adjustable parameter; and present, via a first user interface, the parameterized summary.

The details of one or more aspects of the techniques are set forth in the accompanying drawings and the description below. Other features, objects, and advantages of these techniques will be apparent from the description and drawings, and from the claims.

BRIEF DESCRIPTION OF DRAWINGS

FIGS. 2A-2D are diagrams illustrating example user interface by which to obtain and interact with parameterized narrations for data analytics systems in accordance with various aspects of the techniques described in this disclosure.

DETAILED DESCRIPTION

Figure 1:
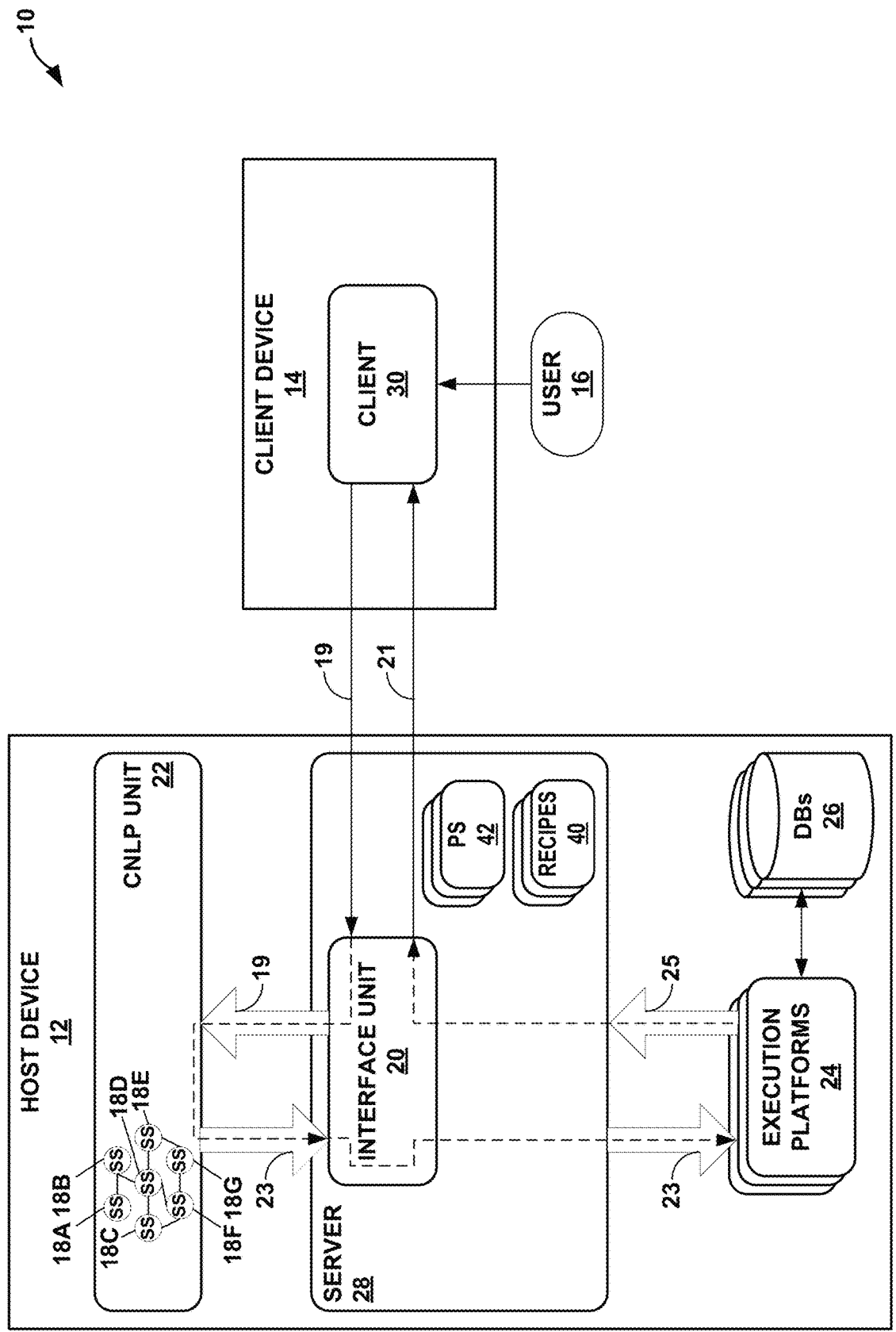
FIG. 1 is a block diagram illustrating a system that may perform various aspects of the techniques described in this disclosure.

FIG. 1 is a diagram illustrating a system 10 that may perform various aspects of the techniques described in this disclosure to enable less cumbersome interactions with data analytic systems. As shown in the example of FIG. 1, system 10 includes a host device 12 and a client device 14. Although shown as including two devices, i.e., host device 12 and client device 14 in the example of FIG. 1, system 10 may include a single device that incorporates the functionality described below with respect to both of host device 12 and client device 14, or multiple clients 14 that each interface with one or more host devices 12 that share a mutual database hosted by one or more of the host devices 12.

Host device 12 may represent any form of computing device capable of implementing the techniques described in this disclosure, including, a network server, a workstation, a handset (or cellular phone, including so-called "smartphones"), a tablet computer, a desktop computer, and a laptop computer to provide a few examples. Likewise, client device 14 may represent any form of computing device capable of implementing the techniques described in this disclosure, including a handset (or cellular phone, including a so-called "smartphone"), a tablet computer, a desktop computer, a laptop computer, a smart speaker, so-called smart headphones, and so-called smart televisions, mixed reality devices (which may refer to augmented reality—AR—devices, virtual reality—VR—devices, so-called smart glasses or any other form of wearable device capable of projecting a user interface), to provide a few examples.

As shown in the example of FIG. 1, host device 12 includes a server 28, a CNLP unit 22, one or more execution platforms 24, and a database 26. Server 28 may represent a unit configured to maintain a conversational context as well as coordinate the routing of data between CNLP unit 22 and execution platforms 24.

Server 28 may include an interface unit 20, which may represent a unit by which host device 12 may present one or more interfaces 21 (which may also be referred to as "user interfaces 21") to client device 14 in order to elicit data 19 indicative of an input and/or present results 25. Data 19 may be indicative of speech input, text input, image input (e.g., representative of text or capable of being reduced to text), or any other type of input capable of facilitating a dialog with host device 12. Interface unit 20 may generate or otherwise output various interfaces 21, including graphical user interfaces (GUIs), command line interfaces (CLIs), or any other interface by which to present data or otherwise provide data to a user 16. Interface unit 20 may, as one example, output a chat interface 21 in the form of a GUI with which the user 16 may interact to input data 19 indicative of the input (i.e., text inputs in the context of the chat server example). Server 28 may output the data 19 to CNLP unit 22 (or otherwise invoke CNLP unit 22 and pass data 19 via the invocation).

CNLP unit 22 may represent a unit configured to perform various aspects of the CNLP techniques described in this disclosure. CNLP unit 22 may maintain a number of interconnected language sub-surfaces (shown as "SS") 18A-18G ("SS 18"). Language sub-surfaces 18 may collectively represent a language, while each of the language sub-surfaces 18 may provide a portion (which may be different portions or overlapping portions) of the language. Each portion may specify a corresponding set of syntax rules and strings permitted for the natural language with which user 16 may interface to enter data 19 indicative of the input. CNLP unit 22 may perform CNLP, based on the language sub-surfaces 18 and data 19, to identify one or more intents 23. More information regarding CNLP may be provided in U.S. patent application Ser. No. 16/441,915, entitled "CONSTRAINED NATURAL LANGUAGE PROCESSING," and filed Jun. 14, 2019, the contents of which are hereby incorporated by reference as if set forth herein in its entirety. CNLP unit 22 may output the intents 23 to server 28, which may in turn invoke one of execution platforms 24 associated with the intents 23, passing the intents 23 to one of the execution platforms 24 for further processing.

Execution platforms 24 may represent one or more platforms configured to perform various processes associated with the identified intents 23. The processes may each perform a different set of operations with respect to, in the example of FIG. 1, databases 26. In some examples, execution platforms 24 may each include processes corresponding to different categories, such as different categories of data analysis including sales data analytics, health data analytics, or loan data analytics, different forms of machine learning, etc. In some examples, execution platforms 24 may perform general data analysis or other forms of data analytics that allows various different combinations of data stored to databases 26 to undergo complex processing and display via charts, graphs, etc. Execution platforms 24 may process the intents 23 to obtain results 25, which execution platforms 24 may return to server 28. Interface unit 20 may generate a GUI 21 that present results 25, transmitting the GUI 21 to client device 14.

In this respect, execution platforms 24 may generally represent different platforms that support applications to perform analysis of underlying data stored to databases 26, where the platforms may offer extensible application development to accommodate evolving collection and analysis of data (or in other words, data analytics) or perform other tasks/intents. For example, execution platforms 24 may include such platforms as Postgres (which may also be referred to as PostgreSQL, and represents an example of a relational database that performs data loading and manipulation), TensorFlow™ (which may perform machine learning in a specialized machine learning engine), and Amazon Web Services (or AWS, which performs large scale data analysis tasks that often utilize multiple machines, referred to generally as the cloud).

Client device 14 may include a client 30 (which may in the context of a chatbot interface be referred to as a "chat client 30"). Client 30 may represent a unit configured to present interfaces 21 and allow entry of data 19. Client 30 may execute within the context of a browser (such as a web browser), as a dedicated third-party application, as a first-party application, or as an integrated component of an operating system (not shown in FIG. 1) of client device 14.

Returning to natural language processing, CNLP unit 22 may perform a balanced form of natural language processing compared to other forms of natural language processing. Natural language processing may refer to a process by which host device 12 attempts to process data 19 indicative of inputs (which may also be referred to as "inputs 19" for ease of explanation purposes) provided via a conversational interaction with client device 14. Host device 12 may dynamically prompt user 16 for various inputs 19, present clarifying questions, present follow-up questions, or otherwise interact with the user in a conversational manner to elicit input 19. User 16 may likewise enter the inputs 19 as sentences or even fragments, thereby establishing a simulated dialog with host device 12 to identify one or more intents 23 (which may also be referred to as "tasks 23").

Host device 12 may present various interfaces 21 by which to present the conversation. An example interface may act as a so-called "chatbot," which may attempt to mimic human qualities, including personalities, voices, preferences, humor, etc. in an effort to establish a more conversational tone, and thereby facilitate interactions with the user by which to more naturally receive input 19. Examples of chatbots include "digital assistants" (which may also be referred to as "virtual assistants"), which are a subset of chatbots focused on a set of tasks dedicated to assistance (such as scheduling meetings, make hotel reservations, schedule delivery of food, perform data analytics, and the like).

A number of different natural language processing algorithms exist to parse the inputs 19 to identify intents 23, some of which depend upon machine learning. However, natural language may not always follow a precise format, and various users may have slightly different ways of expressing inputs 19 that result in the same general intent 23, some of which may result in so-called "edge cases" that many natural language algorithms, including those that depend upon machine learning, are not programmed (or, in the context of machine language, trained) to specifically address. Machine learning based natural language processing may value naturalness over predictability and precision, thereby encountering edge cases more frequently when the trained naturalness of language differs from the user's perceived naturalness of language. Such edge cases can sometimes be identified by the system and reported as an inability to understand and proceed, which may frustrate the user. On the other hand, it may also be the case that the system proceeds with an imprecise understanding of the user's intent, causing actions or results that may be undesirable or misleading.

Other types of natural language processing algorithms utilized to parse inputs 19 to identify intents 23 may rely on keywords. While keyword based natural language processing algorithms may be accurate and predictable, keyword based natural language processing algorithms are not precise in that keywords do not provide much if any nuance in describing different intents 23.

In other words, various natural language processing algorithms fall within two classes. In the first class, machine learning-based algorithms for natural language processing rely on statistical machine learning processes, such as deep neural networks and support vector machines (SVM). Both of these machine learning processes may suffer from limited ability to discern nuances in the user utterances. Furthermore, while the machine learning based algorithms allow for a wide variety of natural-sounding utterances for the same intent, such machine learning based algorithms can often be unpredictable, parsing the same utterance differently in successive versions, in ways that are hard for developers and users to understand. In the second class, simple keyword-based algorithms for natural language processing may match the user's utterance against a predefined set of keywords and retrieve the associated intent.

In this instance, CNLP unit 22 may parse inputs 19 (which may, as one example, include natural language statements that may also be referred to as "utterances") in a manner that potentially balances accuracy, precision, and predictability. CNLP unit 22 may achieve the balance through various design decisions when implementing the underlying language surface (which is another way of referring to the collection of sub-surfaces 18, or the "language"). Language surface 18 may represent a set of potential user utterances for which server 28 is capable of parsing (or, in more anthropomorphic terms, "understanding") the intent of the user 16.

The design decisions may negotiate a tradeoff between competing priorities, including accuracy (e.g., how frequently server 28 is able to correctly interpret the utterances), precision (e.g., how nuanced the utterances can be in expressing the intent of user 16), and naturalness (e.g., how diverse the various phrasing of an utterance that map to the same intent of user 16 can be). The CNLP processes may allow CNLP unit 22 to unambiguously parse inputs 19 (which may also be denoted as the "utterances 19"), thereby potentially ensuring predictable, accurate parsing of precise (though constrained) natural language utterances 19.

While natural language processing may facilitate such data analytics by users unaccustomed with formal (or in other words, structured) database languages, the user interface associated with natural language processing may, in some instances, be cluttered and difficult to understand due to the conversational nature of natural language processing. In some instances, the conversation resulting from natural language processing may distract certain users from the underlying data analytics result, thereby possibly detracting from the benefits of natural language processing in the context of data analytics.

In accordance with various aspects of the techniques described in this disclosure, host device 12 may enable (via interfaces 21 generated by interface unit 20) parameterized narrations (which may also be referred to as parameterized summaries) for data analytic systems. Rather than resort to repeatedly editing complicated sequences of phrasings entered using natural language as exposed by sub-surfaces 18, various aspects of the techniques described in this disclosure may enable host device 12 to obtain a summary (or other high level narration) that distills the sequence of phrasings (which may be referred to as a recipe, which are shown as recipes 40 in the example of FIG. 1) into a simplified narration. Host device 12 may then parameterize a field (possibly at user direction) of the summarized narration to insert a user adjustable parameter that enables manipulation of the underlying recipe. Parameterized summaries (PS) are shown in the example of FIG. 1 as PS 42.

User 16 may then interact with PS 42 to quickly understand underlying recipe 40 while also adapting the user adjustable parameter to accommodate changes to data analysis over time with regard to recipe 40, potentially avoiding having to reenter recipe 40. Moreover, user 16 may share recipe 40 (via interactions with host device 12) within business units, across business units, within an entire organization, etc. via PS 42, allowing users unfamiliar with construction of recipe 40 to quickly adapt underlying recipe 40, via the user adjustable parameter of PS 42, to accommodate the data analysis needs of each individual user.

In operation, host device 12 may invoke interface unit 20 of server 28 to output a user interface 21 to client device 14. Client 30 of client device 14 may present user interface 21 with which user 16 may interact to enter a sequence of inputs 19 defining recipe 40 for analyzing multi-dimensional data stored to DBs 26. Inputs 19, as discussed above, may conform to one or more language sub-surfaces 18 specifying a natural language containment hierarchy defining a grammar for a natural language as a hierarchical arrangement of a plurality of language sub-surfaces. Interface unit 20 may receive the sequence of inputs 19, and responsive to receiving inputs 19, invoke CNLP unit 22 to process inputs 19 and generate intents 23.

Server 28 may receive intents and invoke execution platforms 24 to process intents 23. One or more of execution platforms 23 may process intents 23 to generate results 25, which execution platforms 24 may pass back to interface unit 20. Interface unit 20 may update user interface 21 to include results 25. Interface unit 20 may output update user interface 21 to client device 14, which may invoke client 30 to present updated user interface 21.

User 16 may navigate updated user interface 21 to save recipe 40, which may result in server 28 saving recipe 40 locally (or possibly to one or more of DBs 26). User 16 may save any number of recipes 40 in this manner. User 16 may also navigate updated user interface 21 to enable entry of data indicative of a summarized narration of recipe 40. In some instances, user 16 may interact, via client 30, with updated user interface 21 to provide additional inputs 19 that requests a summary user interface dedicated to presenting recipe 40 alongside a text entry box for entering a summarized narration of recipe 40. Interface unit 20 may, responsive to inputs 19, generate and output the summary user interface 21 by which user 16 may enter inputs 19 as data indicative of the summarized narration of recipe 40.

Interface unit 20 may save inputs 19 representative of data indicative of the summarized narration as PS 42. User 16 may continue to interact with summary user interface 21 to parameterize a field of PS 42 to insert a user adjustable parameter that enables manipulation of underlying recipe 40 (which, in other words, represents a recipe associated with PS 42) and obtain PS 42 that includes the user adjustable parameter. User 16 may interface with summary user interface 21 to specify inputs 19 that link the field of PS 42 with a field of recipe 40.

In other words, user 16 may, via summary user interface 21, specify a selection of one or more symbols of the data indicative of the summary narration as the field of the summarized narration. User 16 may, for example, specify the selection of one or more symbols by highlighting (using a mouse cursor or other selection device) the one or more symbols. User 16 may then select a link button (or possibly right click on the selection of the one or more symbols using the right button of the mouse or other selection device) to enable linking of the field of PS 42 and the field of recipe 40. User 16 may then select the field of recipe 40 (following selection of the link button) to associate the field of PS 42 with the field of recipe 40.

In this respect, interface unit 40 may receive, via summary user interface 21 and from user 16, input 19 representing a selection of one or more symbols of the text data representative of PS 42 as the field of the summarized narration. Interface unit 40 may also receive, via summary user interface 21 and from user 16, a selection of a field of recipe 40. Interface unit 40 may then link the field of PS 42 to the field of recipe 40 to enable the field of PS 42 to operate as the user adjustable parameter by which the user adjusts the linked field of recipe 42.

Interface unit 20 may next output, via summary user interface 21, PS 42 that includes the user adjustable parameter. User 16 may then interact with summary user interface 21 to share PS 42 (along with recipe 40) with other users (which are not shown for ease of illustration purposes). In addition, user 16 may enter (as input 19) a replacement value for the user adjustable parameter, where the replacement value is different than a default value for the user adjustable parameter. Interface unit 20 may receive the replacement value and update the associated field of recipe 40 to replace the default value for the user adjustable parameter with the replacement value and obtain an updated recipe 40.

Interface unit 20 may then interface with execution platforms 24 to execute updated recipe 40 to perform, based on the replacement value, data analysis with respect to the multi-dimensional data stored to DBs 26. As noted above, execution platforms 24 may execute updated recipe 42 to obtain results 25, which execution platforms 24 may return to interface unit 20. Interface unit 20 may generate and output, e.g., to client device 14, a user interface 20 that presents results 25 obtained through execution of updated recipe 40.

In this respect, various aspect of the techniques described in this disclosure may facilitate access to data analysis without requiring a comprehensive understanding of formal database query languages or even recipe construction. Moreover, the techniques may enable users, such as user 16, to individually adapt such recipes via the user adjustable parameters of PS 42 without having to reenter or even understand recipe 40 itself. In this way, various aspects of the techniques may improve the user experience in performing data analytics with respect to large multi-dimensional datasets.

As such, various aspects of the techniques may improve operation of the underlying host device 12 itself in terms of avoiding redundant entry of recipes 40 by unexperienced users that can often result in errors or incorrect results that would otherwise consume computing resources (e.g., processor cycles, memory, memory bus bandwidth, and associated power). In this way, users may quickly reuse and adapt existing recipes 40 while maintaining a high level understanding of underlying recipe 40 via associated PS 42, thereby facilitating more efficient operation (in terms of the above noted computing resources) of host device 12 itself.

Figure 2A:

FIGS. 2A-2D are diagrams illustrating example user interface by which to obtain and interact with parameterized narrations for data analytics systems in accordance with various aspects of the techniques described in this disclosure. In the example of FIG. 2A, a user interface 121A may represent one example of user interface 21 shown in the example of FIG. 1. User interface 121A may present an overview of recipes 40 and may therefore be referred to as an overview user interface 121A.

Overview user interface 121A may include an active sessions panel 150 and a workflow panel 160. Active session panel 150 may present active session entries 152A-152C ("active session entries 152") that each represent an ongoing active session with host device 12. Interface unit 20 may generate overview user interface 121A, populating active session panel 150 with active session entries 152 that reflect active sessions with various execution platforms 24 of host device 12. User 16 may select one of active session entries 152 to view the active session currently under development during a session with host device 12.

Workflows panel 160 may represent a panel (e.g., such as a frame) that provides an overview of workflow entries 140A-140D ("workflow entries 140"), which may each represent a saved active session (or in other words "workflow") with host device 12. Workflow entries 140 may each represent a different recipe 40 and, as such, may also be referred to as "recipe entries 140." Each of recipe entries 140 may include a play button 142, an edit button 144, and a list order button 146. In the example of FIG. 2A, only recipe entry 140B has play button 142, edit button 144, and list order button 146 denoted by way of a reference numerals for ease of illustration purposes, but each recipe entry includes similar buttons 142-146.

In any event, play button 142 may, when selected, configure interface unit 20 to play back a corresponding one of recipes 40, recreating a previous workflow or, in other words, corresponding one of recipes 40 for evaluation. Interface unit 20 may resubmit intents 23 (e.g., which are the steps of the corresponding one of recipes 40) to the assigned execution platform(s) 24) to obtain results 25 from execution of the corresponding one of recipes 40. Interface unit 20 may, responsive to receiving results 25, generate a chat user interface 21 populated with the corresponding one of recipes 40 interleaved with results 25. Interface unit 20 may then output chat user interface 21 to client device 14, which may invoke client 30 to display chat user interface 21.

Figure 2B:
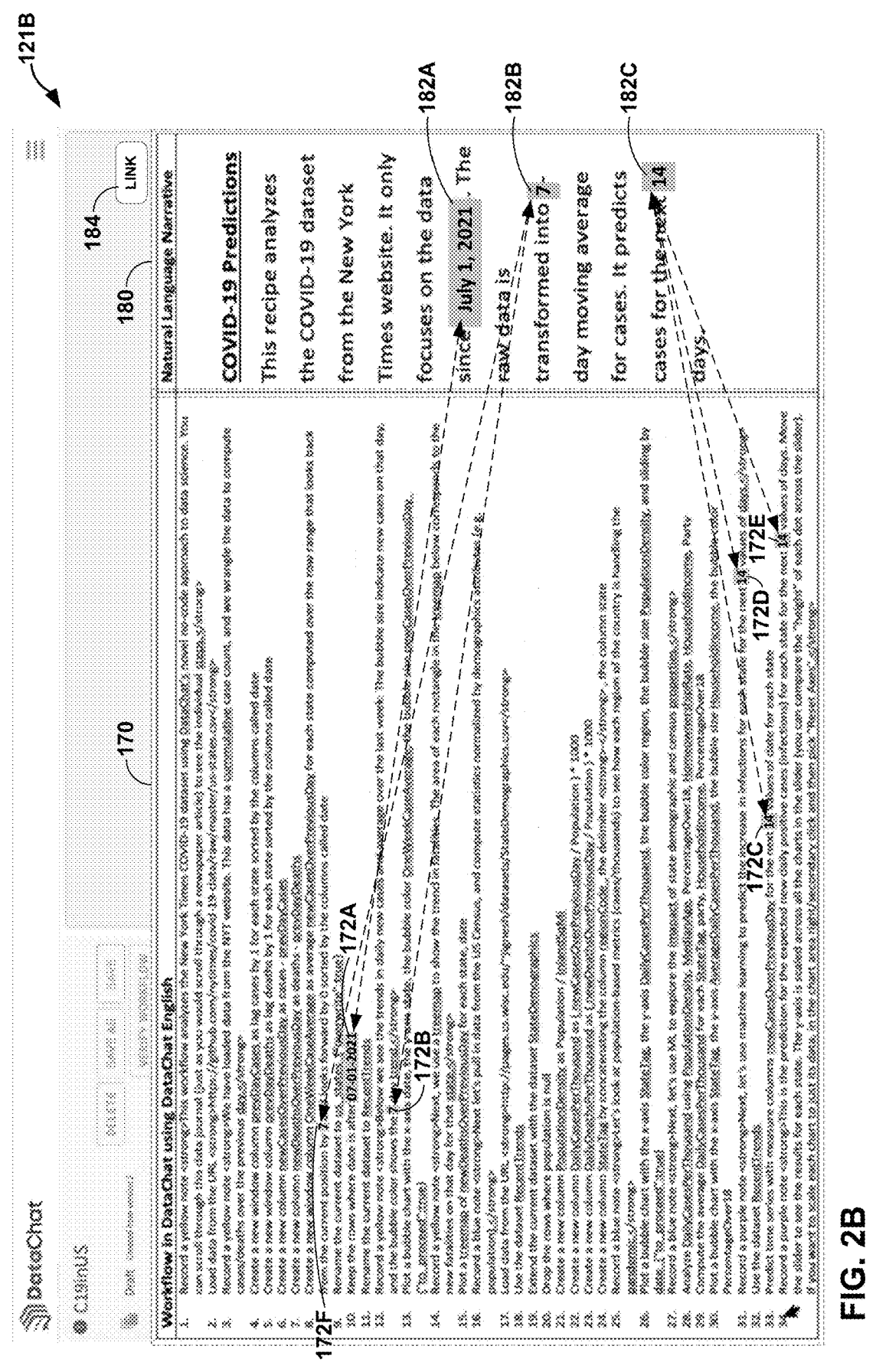
Figure 2C:
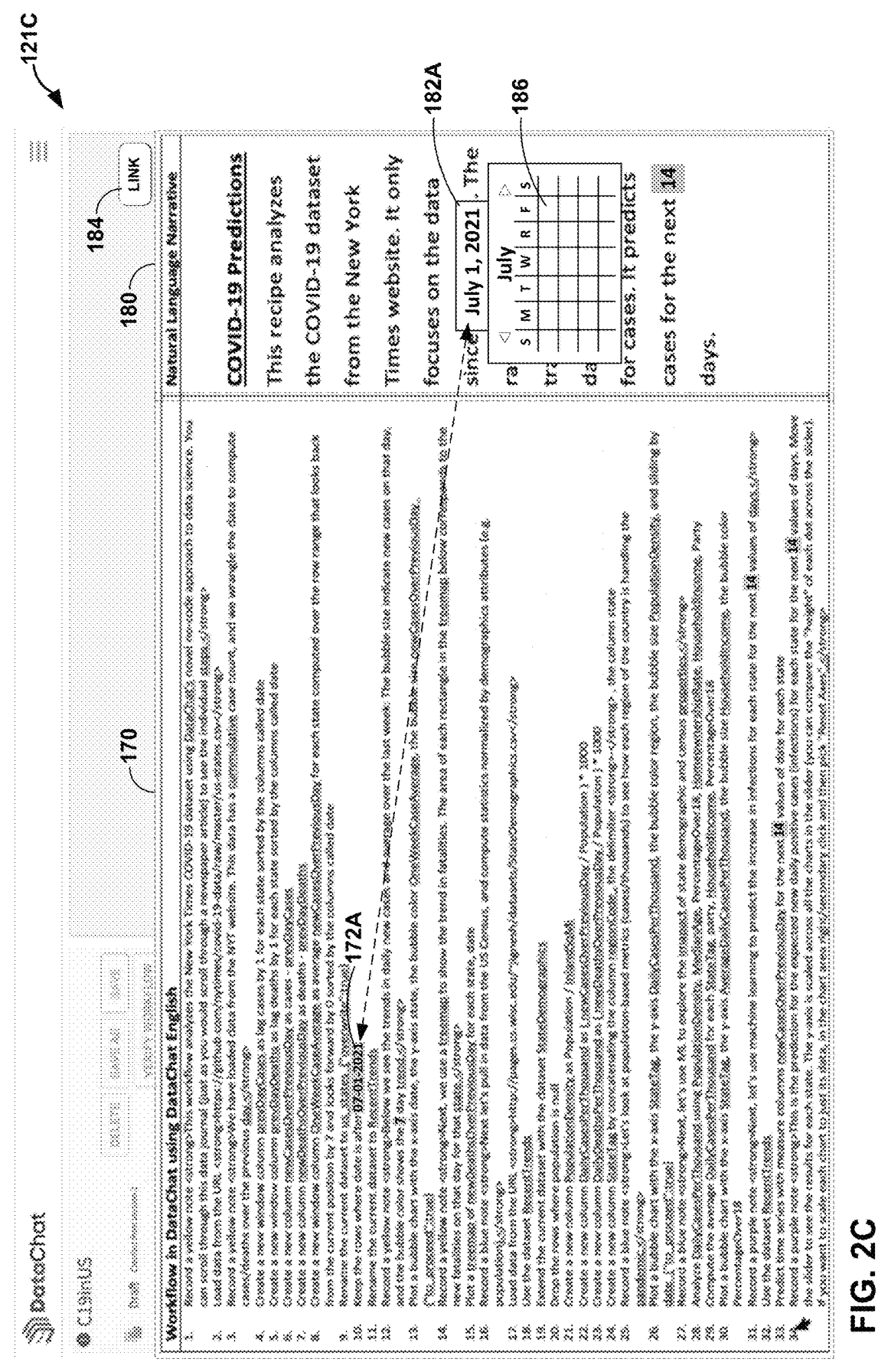
Figure 2D:
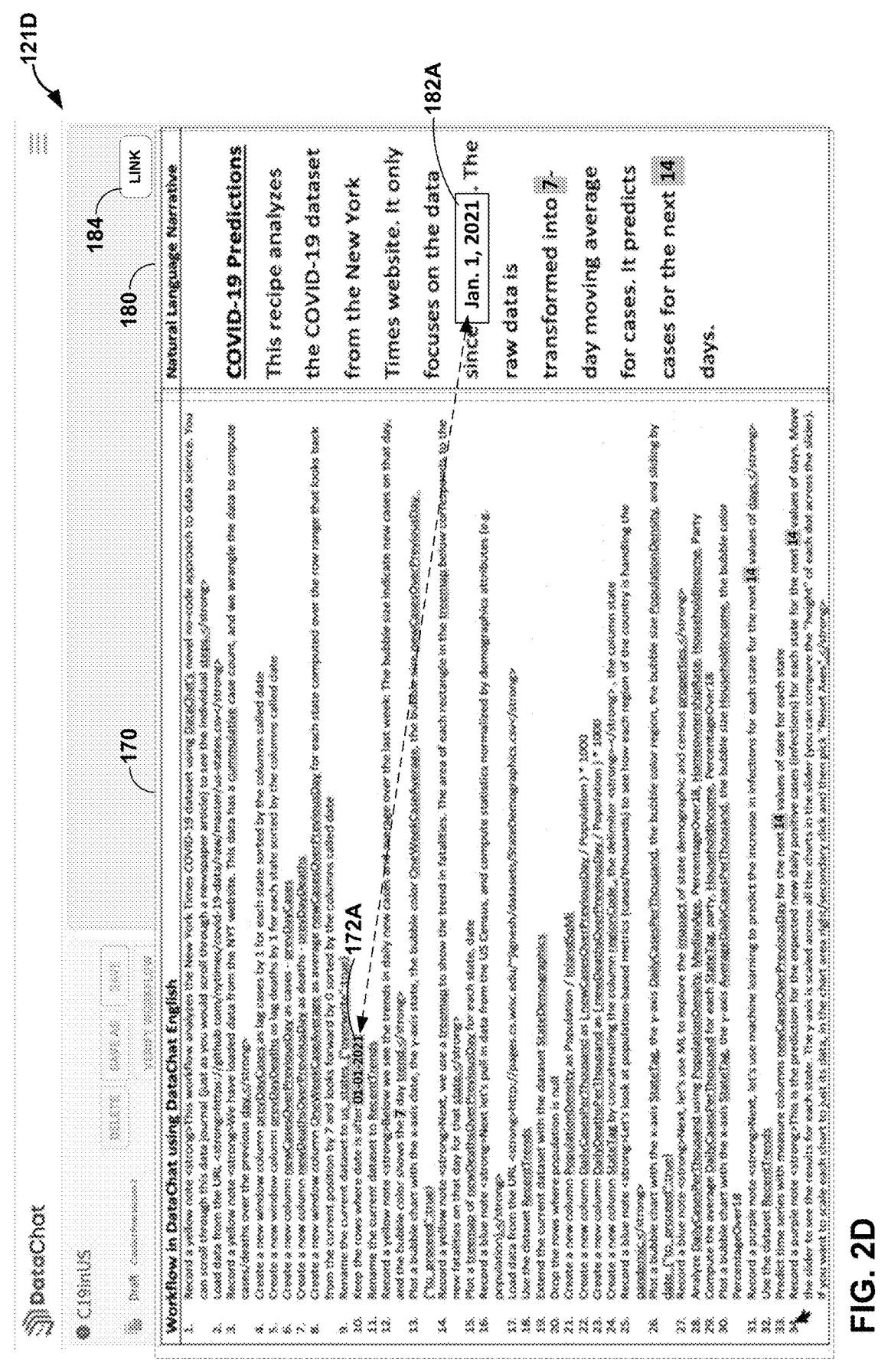

Edit button 144 may, when selected by user 16, configure interface unit 20 to obtain a recipe editor user interface 21 used to edit the corresponding one of recipes 40 and define PS 42 for the corresponding one of recipes 40 (which is discussed in more detail with respect to the examples of FIGS. 2B-2D). Interface unit 20 may output recipe editor user interface 21 to client device 14, which may invoke client 30 to present recipe editor user interface 21. List order button 146 may, when selected by user 16, configure overview user interface 121A to reorder recipe entries 140 relative to remaining ones of recipe entries 140.

In the example of FIG. 2B, a recipe editor user interface 121B is shown, which represents a transition from overview user interface 121B to recipe editor user interface 121B responsive to user 16 selecting edit button 144 of recipe entry 140B. That is, user 16 may select edit button 144, which client 30 may output as an input 19 to interface unit 20. Interface unit 20 may process input 19 indicative of selection of edit button 144 and generate, responsive to input 19 indicative of selection of edit button 144, recipe editor user interface 121B. Interface unit 20 may output recipe editor user interface 121B to client 30 of client device 14, which may present recipe editor user interface 121B to user 16.

Recipe editor user interface 121B may include a recipe editor pane 170 and a summary narrative pane 180. Recipe editor pain 170 may provide text editing functionality for recipe 40 (saved as "C19inUS," which refers to data analytics performed with respect to multi-dimensional data specifying covid-19 infections in the United States) shown as 34 steps of input 19. User 16 may edit recipe 40, such as modifying one or more steps to change data analysis of the multi-dimensional data. Summary narrative pane 180 may provide text editing functionality for defining PS 42 for the corresponding recipe denoted as recipe 40 shown in recipe editor pane 170.

Via summary narrative pane 180, user 16 may specify the above noted data indicative of PS 42 as a sequence of symbols (which in this instance includes text characters and numbers). In the example of FIG. 2B, user 16 has provided the following data indicative of the summarized narration of recipe 40:

This recipe analyzes the COVID-19 dataset from the New York Times website. It only focuses on the data since Jul. 1, 2021. The raw data is transformed into 7-day moving average for cases. It predicts cases for the next 14 days.

Via recipe editor user interface 121B, user 16 may select one or more fields of the summarized narration for recipe 40. User 16 may specify a selection of one or more symbols of the data indicative of the summarized narration as the field of the summarized narration. In the example of FIG. 2B, user 16 may enter the selection of the one or more symbols by highlighting the date shown in the above summarized narration, creating field 182A. User 16 may next select link button 184 to initiate linking of field 182A to a yet-to-be denoted field in recipe 40.

After selecting link button 184, user 16 may select corresponding symbols defining at least a portion of recipe 40. In this example, user 16 has highlighted symbols corresponding to the date specified in field 182A of PS 42 (and shown as "Jul. 1, 2021"), creating field 172A of recipe 40. Upon creating field 172A of recipe 40, recipe editor user interface 121B may link (or, in other words, associate) field 182A of PS 42 to field 172A of recipe 40 allowing field 182A to operate as a user adjustable parameter by which user 16 adjusts linked field 172A of recipe 40.

During entry of fields 182A and 172A along with linking, recipe editor user interface 121B may interface with interface unit 20 to provide inputs 19 denoting fields 182A and 172A along with the link operation. Interface unit 20 may therefore receive the selection of one or more symbols of the text data as field 182A of PS 42, while also receiving a selection of field 172A of recipe 40. Responsive to receiving input 19 indicative of the link operation, interface unit 20 may link field 182A of PS 42 to field 172A to enable field 182A to operate as the user adjustable parameter by which user 16 may adjust linked field 172A of recipe 40. Interface unit 20 may save PS 42 in the manner noted above for later display in overview user interface 121A.

In some examples, interface unit 20 may ensure a type of data within the selection forming field 182A of PS 42 and a type of data within the selection forming field 172A of recipe 40 are compatible. As such, interface unit 20 may determine a compatibility between the data type of field 182A of PS 42 and the data type of field 172A of recipe 40. Interface unit 20 may perform data reformatting between the data types to synchronize the data format between fields 182A and 172A. For example, interface unit 20 may reformat "Jul. 1, 2021" of field 182A to a standardized format of MM-DD-YYYY (or, in this example, Jul. 1, 2021). Interface unit 20 may alternatively reformat "Jul. 1, 2021" of field 172A to a standardized format of Month Day, Year (or, in this example, Jul. 1, 2021). In some instances, interface unit 20 may reformat the data of both fields 182A and 172A.

In any event, interface unit 20 may link, based on the determined compatibility, field 182A of PS 42 and field 172A of recipe 40. In this example, interface unit 20 may determine that the data type of field 182A is compatible with the data type of field 172A, and perform, responsive to determining that the data types of fields 182A and 172A are compatible, the link between fields 182A and 172A. In instances where the data types are compatible, but the underlying data specifies a different value, interface module 20 may interface with recipe editor user interface 121B to present a suggestion for correcting either the text of PS 42 within field 182A or the text of recipe 40 within field 172A so that the values correspond to one another (or may automatically change the value in either of fields 172A or field 182A with a corresponding alert noting such change). In instances where the data types are not compatible (e.g., different data types, such as an integer versus a date), interface unit 20 may not performing the linking between fields 182A and 172A.

User 16 may continue in the manner to parameterize the summarized narration shown above, creating and linking field 182B of PS 42 to fields 172B and 172F. User 16 may additionally create and link field 182C of PS 42 to multiple fields 172C-172E. In both of these instances, user 16 may select multiple fields 172B,172F and 172C-172E after selecting link button 184 to associate respective fields 172B, 172F, and 172C-172E to a single field 182B and 182C.

While described above with respect to associating a single one of fields 182A-182C of PS 42 to one or more fields 172A-172F of recipe 40, interface unit 20 may associate multiple fields 182A-182C to a single one of fields 172A-172F and/or multiple fields 172A-172F. In addition, user 16 may first create fields 172A-172F and select link button 184 to link fields 172A-172F to one or more of fields 182A-182C.

Further, while certain symbols of certain data types (e.g., date and integer) are shown for purposes of example, any sequence of symbols having a verifiable data type may be selected as one of fields 172A-172E and/or fields 182A-182C. For example, data types of date type, duration type, integer type, string type, statistical analysis type, data analytics type, graph type, plot type, table type, etc. may form the basis for different types of fields 182A-182C and/or fields 172A-172E that result in corresponding date fields, duration fields, integer fields, string fields, statistical analysis fields, data analytics fields, graph fields, plot fields, table fields, etc.

In the example of PS 42 shown in summarized narration pane 180, user 16 may select "moving average" as a data analytics type to create a field for defining a user adjustable parameter having a data type of data analytics (which interface unit 21 may populate with different types of data analytics, such as weighted moving average, exponential moving average, etc). User 16 may, as another example, select "day" as a duration type to create a field for defining a user adjustable parameter having a data type of duration (which interface unit 20 may populate with different types of durations, such as hour, day, week, month, year, etc.).

Once user 16 has completed PS 42, interface unit 20 may save PS 42 (e.g., either locally or to DBs 26) for later reference. User 16 may at some later point in time, interact with recipe editor user interface 121B to define a replacement value for the user adjustable parameter that is different than the default value for the user adjustable parameter. For example, fields 182A-182C of PS 42 may have respective default values of "Jul. 1, 2021," "7," and "14" for each of the user adjustable parameters represented by fields 182A-182C.

In the example of FIG. 2C, a user interface 121C reflects user interaction by user 16 to enter a replacement value for the user adjustable parameter represented by field 182A of PS 42. User 16 may select (e.g., via a cursor) field 182A to reveal a date selector 186 with which user 16 may interact to select a replacement value for field 182A that will replace default value "Jul. 1, 2021." While described with respect to date selector 186 depicting a graphical element representative of a calendar, date selector 186 may represent any interface by which to select a date value as the replacement value for field 182A (e.g., a text entry box, a drop down for month, date, year, etc.). User 16 may continue in this manner to enter replacement values for parameters 182A-182C.

Interface unit 20 may receive inputs 19 representative of the replacement values for one or more of fields 182A-182C (i.e., field 182A in the example of FIG. 2C). Interface unit 20 may identify via PS 42 those of fields 182A to which the replacement values correspond (as input 19 may identify the replacement values and to which fields 182A-182C the replacement values corresponds), and next determine which of fields 172A-172E of recipe 40 are to be updated (as each of fields 182A-182C are associated with one or more of fields 172A-172E). Interface unit 20 may next update one or more associated fields 172A-172E of recipe 40 to replace the default value ("Jul. 1, 2021") for the user adjustable parameter with the replacement value (e.g., "Jan. 1, 2021" as shown in the example of FIG. 2D) and thereby obtain an updated recipe 40 having a new default value of "Jan. 1, 2021"). Interface unit 20 may update PS 42 and output a user interface 121D (as shown in the example of FIG. 2D) providing updated recipe 40 (with associated field 172A having the replacement value of "Jan. 1, 2021") and PS 42 (with the replacement value of "Jan. 1, 2021" for field 182A).

User 16 may interact with user interface 121D to execute updated recipe 40 to perform, based on replacement value of "Jan. 1, 2021," data analysis with respect to the multidimensional data representative of COVID-19 infections in the United States. Interface unit 20 may receive input 19 to execute updated recipe 40 and interface with the associated execution platforms 24 to execute updated recipe 40, receiving results 25 that interface unit 20 may use to construct a user interface 21 providing the chat user interface detailing updated recipe 40 and results 25.

Figure 3:
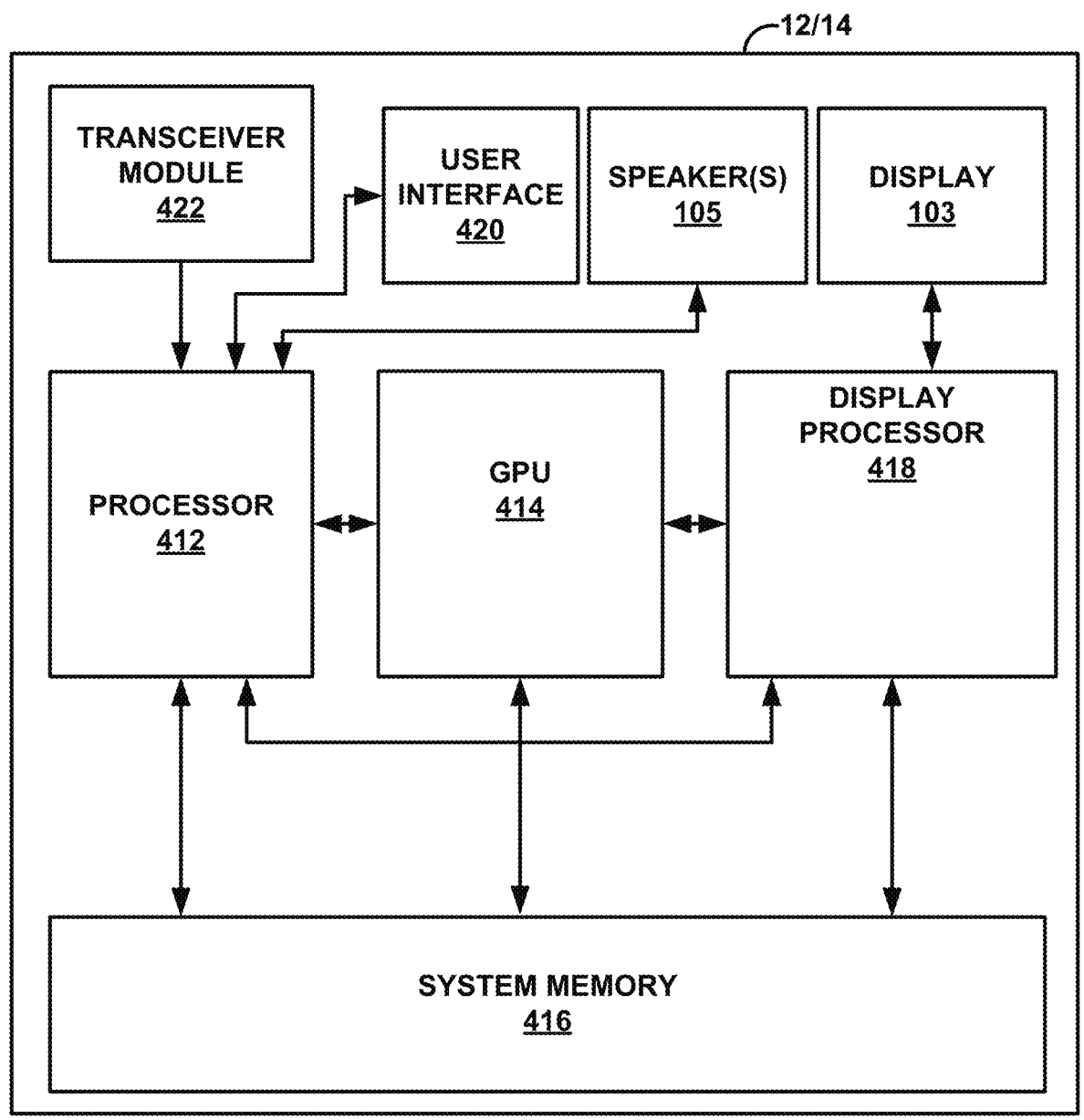
FIG. 3 is a block diagram illustrating example components of the host device and/or the client device shown in the example of FIG. 1.
Figure 4:
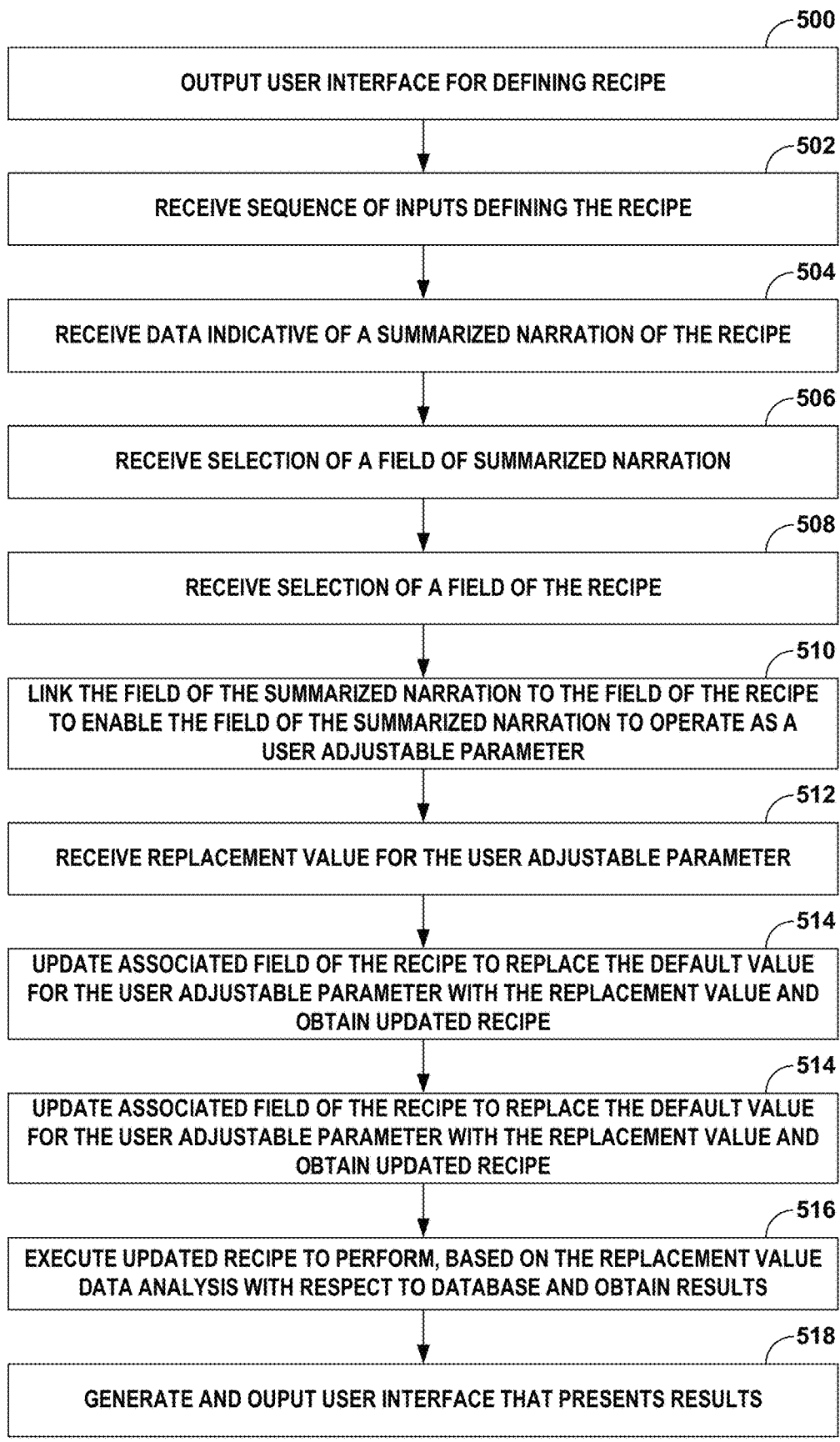
FIG. 4 is a flowchart illustrating example operation of the system of FIG. 1 in performing various aspects of the techniques described in this disclosure to enable parameterized narrations for data analytic recipes.

FIG. 3 is a block diagram illustrating example components of host device 12 and/or client device 14 shown in the example of FIG. 1. In the example of FIG. 4, the device 12/14 (which is another way to refer to host device 12 and/or client device 14) includes a processor 412, a graphics processing unit (GPU) 414, system memory 416, a display processor 418, one or more integrated speakers 105, a display 103, a user interface 420, and a transceiver module 422. In examples where the device 12/14 is a mobile device, the display processor 418 is a mobile display processor (MDP). In some examples, such as examples where the device 12/14 is a mobile device, the processor 412, the GPU 414, and the display processor 418 may be formed as an integrated circuit (IC).

For example, the IC may be considered as a processing chip within a chip package and may be a system-on-chip (SoC). In some examples, two of the processors 412, the GPU 414, and the display processor 418 may be housed together in the same IC and the other in a different integrated circuit (i.e., different chip packages) or all three may be housed in different ICs or on the same IC. However, it may be possible that the processor 412, the GPU 414, and the display processor 418 are all housed in different integrated circuits in examples where the device 12/14 is a mobile device.

Examples of the processor 412, the GPU 414, and the display processor 418 include, but are not limited to, one or more digital signal processors (DSPs), general purpose microprocessors, application specific integrated circuits (ASICs), field programmable logic arrays (FPGAs), or other equivalent integrated or discrete logic circuitry. The processor 412 may be the central processing unit (CPU) of the device 12/14. In some examples, the GPU 414 may be specialized hardware that includes integrated and/or discrete logic circuitry that provides the GPU 414 with massive parallel processing capabilities suitable for graphics processing. In some instances, GPU 414 may also include general purpose processing capabilities, and may be referred to as a general-purpose GPU (GPGPU) when implementing general purpose processing tasks (i.e., non-graphics related tasks). The display processor 418 may also be specialized integrated circuit hardware that is designed to retrieve image content from the system memory 416, compose the image content into an image frame, and output the image frame to the display 103.

The processor 412 may execute various types of the applications. Examples of the applications include web browsers, e-mail applications, spreadsheets, video games, other applications that generate viewable objects for display, or any of the application types listed in more detail above. The system memory 416 may store instructions for execution of the applications. The execution of one of the applications 20 on the processor 412 causes the processor 412 to produce graphics data for image content that is to be displayed and the audio data that is to be played. The processor 412 may transmit graphics data of the image content to the GPU 414 for further processing based on and instructions or commands that the processor 412 transmits to the GPU 414.

The processor 412 may communicate with the GPU 414 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and the processor 412 and the GPU 414 may utilize any technique for communication.

The system memory 416 may be the memory for the device 12/14. The system memory 416 may comprise one or more computer-readable storage media. Examples of the system memory 416 include, but are not limited to, a random-access memory (RAM), an electrically erasable programmable read-only memory (EEPROM), flash memory, or other medium that can be used to carry or store desired program code in the form of instructions and/or data structures and that can be accessed by a computer or a processor.

In some examples, the system memory 416 may include instructions that cause the processor 412, the GPU 414, and/or the display processor 418 to perform the functions ascribed in this disclosure to the processor 412, the GPU 414, and/or the display processor 418. Accordingly, the system memory 416 may be a computer-readable storage medium having instructions stored thereon that, when executed, cause one or more processors (e.g., the processor 412, the GPU 414, and/or the display processor 418) to perform various functions.

The system memory 416 may include a non-transitory storage medium. The term "non-transitory" indicates that the storage medium is not embodied in a carrier wave or a propagated signal. However, the term "non-transitory" should not be interpreted to mean that the system memory 416 is non-movable or that its contents are static. As one example, the system memory 416 may be removed from the client device 14 and moved to another device. As another example, memory, substantially similar to the system memory 416, may be inserted into the devices 12/14. In certain examples, a non-transitory storage medium may store data that can, over time, change (e.g., in RAM).

The user interface 420 may represent one or more hardware or virtual (meaning a combination of hardware and software) user interfaces by which a user may interface with the device 12/14. The user interface 420 may include physical buttons, switches, toggles, lights or virtual versions thereof. The user interface 420 may also include physical or virtual keyboards, touch interfaces—such as a touchscreen, haptic feedback, and the like.

The processor 412 may include one or more hardware units (including so-called "processing cores") configured to perform all or some portion of the operations discussed above with respect to one or more of the various units/modules/etc. The transceiver module 422 may represent a unit configured to establish and maintain the wireless connection between the devices 12/14. The transceiver module 422 may represent one or more receivers and one or more transmitters capable of wireless communication in accordance with one or more wireless communication protocols.

FIG. 4 is a flowchart illustrating example operation of the system of FIG. 1 in performing various aspects of the techniques described in this disclosure to enable parameterized narrations for data analytic recipes. Host device 12 may invoke interface unit 20 of server 28 to output a user interface 21 to client device 14 for defining a recipe 40 (500). Client 30 of client device 14 may present user interface 21 with which user 16 may interact to enter a sequence of inputs 19 defining recipe 40 for analyzing multi-dimensional data stored to DBs 26. Inputs 19, as discussed above, may conform to one or more language sub-surfaces 18 specifying a natural language containment hierarchy defining a grammar for a natural language as a hierarchical arrangement of a plurality of language sub-surfaces. Interface unit 20 may receive the sequence of inputs 19 defining recipe 40 (502), and responsive to receiving inputs 19, invoke CNLP unit 22 to process inputs 19 and generate intents 23.

Server 28 may receive intents and invoke execution platforms 24 to process intents 23. One or more of execution platforms 23 may process intents 23 to generate results 25, which execution platforms 24 may pass back to interface unit 20. Interface unit 20 may update user interface 21 to include results 25. Interface unit 20 may output update user interface 21 to client device 14, which may invoke client 30 to present updated user interface 21.

User 16 may navigate updated user interface 21 to save recipe 40, which may result in server 28 saving recipe 40 locally (and/or possibly to one or more of DBs 26). User 16 may save any number of recipes 40 in this manner. User 16 may also navigate updated user interface 21 to enable entry of data indicative of a summarized narration of recipe 40. In some instances, user 16 may interact, via client 30, with updated user interface 21 to provide additional inputs 19 that requests a summary user interface dedicated to presenting recipe 40 alongside a text entry box for entering a summarized narration of recipe 40. Interface unit 20 may, responsive to inputs 19, generate and output the summary user interface 21 by which user 16 may enter inputs 19 as data indicative of the summarized narration of recipe 40.

Interface unit 20 may receive inputs 19 representative of data indicative of the summarized narration (504), saving such inputs 19 as PS 42. User 16 may continue to interact with summary user interface 21 to parameterize a field of PS 42 to insert a user adjustable parameter that enables manipulation of underlying recipe 40 (which, in other words, represents a recipe associated with PS 42) and obtain PS 42 that includes the user adjustable parameter. User 16 may interface with summary user interface 21 to specify inputs 19 that link the field of PS 42 with a field of recipe 40.

In other words, user 16 may, via summary user interface 21, specify a selection of one or more symbols of the data indicative of the summary narration as the field of the summarized narration. User 16 may, for example, specify the selection of one or more symbols by highlighting (using a mouse cursor or other selection device) the one or more symbols. User 16 may then select a link button (or possibly right click on the selection of the one or more symbols using the right button of the mouse or other selection device) to enable linking of the field of PS 42 and the field of recipe 40. User 16 may then select the field of recipe 40 (following selection of the link button) to associate the field of PS 42 with the field of recipe 40.

In this respect, interface unit 40 may receive, via summary user interface 21 and from user 16, input 19 representing a selection of one or more symbols of the text data representative of PS 42 as the field of the summarized narration (506). Interface unit 40 may also receive, via summary user interface 21 and from user 16, a selection of a field of recipe 40 (508). Interface unit 40 may then link the field of PS 42 to the field of recipe 40 to enable the field of PS 42 to operate as the user adjustable parameter by which the user adjusts the linked field of recipe 42 (510).

Interface unit 20 may next output, via summary user interface 21, PS 42 that includes the user adjustable parameter. User 16 may then interact with summary user interface 21 to share PS 42 (along with recipe 40) with other users (which are not shown for ease of illustration purposes). In addition, user 16 may enter (as input 19) a replacement value for the user adjustable parameter, where the replacement value is different than a default value for the user adjustable parameter. Interface unit 20 may receive the replacement value for the user adjustable parameter (512) and update the associated field of recipe 40 to replace the default value for the user adjustable parameter with the replacement value and obtain an updated recipe 40 (514).

Interface unit 20 may then interface with execution platforms 24 to execute updated recipe 40 to perform, based on the replacement value, data analysis with respect to the multi-dimensional data stored to DBs 26 and obtain results 25 (516). As noted above, execution platforms 24 may execute updated recipe 42 to obtain results 25, which execution platforms 24 may return to interface unit 20. Interface unit 20 may generate and output, e.g., to client device 14, a user interface 20 that presents results 25 obtained through execution of updated recipe 40 (518).

In this respect, various aspect of the techniques described in this disclosure may facilitate access to data analysis without requiring a comprehensive understanding of formal database query languages or even recipe construction. Moreover, the techniques may enable users, such as user 16, to individually adapt such recipes via the user adjustable parameters of PS 42 without having to reenter or even understand recipe 40 itself. In this way, various aspects of the techniques may improve the user experience in performing data analytics with respect to large multi-dimensional datasets.

As such, various aspects of the techniques may improve operation of the underlying host device 12 itself in terms of avoiding redundant entry of recipes 40 by unexperienced users that can often result in errors or incorrect results that would otherwise consume computing resources (e.g., processor cycles, memory, memory bus bandwidth, and associated power). In this way, users may quickly reuse and adapt existing recipes 40 while maintaining a high level understanding of underlying recipe 40 via associated PS 42, thereby facilitating more efficient operation (in terms of the above noted computing resources) of host device 12 itself.

In this way, various aspects of the techniques may enable the following clauses:

Clause 1. A device configured to perform data analytics, the device comprising: a memory configured to store multi-dimensional data; and one or more processors configured to: receive a sequence of inputs defining a recipe for analyzing the multi-dimensional data according to a language sub-surface specifying a natural language containment hierarchy defining a grammar for a natural language as a hierarchical arrangement of a plurality of language sub-surfaces; receive data indicative of a summarized narration of the recipe; parameterize a field of the summarized narration to insert a user adjustable parameter that enables manipulation of the underlying recipe and obtain a parameterized summary that includes the user adjustable parameter; and present, via a first user interface, the parameterized summary.

Clause 2. The device of clause 1, wherein the one or more processors are, when configured to receive data indicative of the summarized narration of the recipe, configured to present, via a second user interface, a text entry field by which to receive, from a user, text data indicative of the summarized narration of the receipt.

Clause 3. The device of clause 2, wherein the one or more processors are, when configured to parameterize the fields of the summarized narration, configured to: receive, via the second user interface and from the user, a selection of one or more symbols of the text data as the field of the summarized narration; receive, via the second user interface and from the user, a selection of a field of the recipe; and link the field of the summarized narration to the field of the recipe to enable the field of the summarized narration to operate as the user adjustable parameter by which the user adjusts the linked field of the recipe.

Clause 4. The device of clause 3, wherein the one or more processors are, when configured to link the field of the summarized narration to the field of the recipe, configured to: determine a data type of the field of the summarized narration; determine a data type of the field of the recipe; determine a compatibility between the data type of the field of the summarized narration and the data type of the field of the recipe; and link, based on the compatibility, the field of the summarized narration to the field of the recipe.

Clause 5. The device of any combination of clauses 1-4, wherein the field of the summarized narration includes one of a date field, a duration field, and a data analytics field.

Clause 6. The device of any combination of clauses 1-5, wherein the one or more processors are, when configured to parameterize the fields of the summarized narration, configured to: receive, via a second user interface and from a user, a selection of one or more symbols of the data as the field of the summarized narration; receive, via the second user interface and from the user, a selection of a field of the recipe; and link the field of the summarized narration to the field of the recipe to enable the field of the summarized narration to operate of the user adjustable parameter by which the user adjusts the linked field of the recipe.

Clause 7. The device of any combination of clauses 1-6, wherein the one or more processors are further configured to: receive, via the first user interface, a replacement value for the user adjustable parameter that is different than a default value for the user adjustable parameter; and update the recipe to replace the default value for the user adjustable parameter with the replacement value and obtain an updated recipe.

Clause 8. The device of clause 7, wherein the one or more processors are further configured to execute the updated recipe to perform, based on the replacement value, data analysis with respect to the multi-dimensional data.

Clause 9. The device of any combination of clauses 1-8, wherein each of the language sub-surfaces specify a corresponding set of syntax rules and strings permitted for the natural language with which a user may interface to enter the data indicative of the input.

Clause 10. A method for performing data analytics, the method comprising: receiving a sequence of inputs defining a recipe for analyzing the multi-dimensional data according to a language sub-surface specifying a natural language containment hierarchy defining a grammar for a natural language as a hierarchical arrangement of a plurality of language sub-surfaces; receiving data indicative of a summarized narration of the recipe; parameterizing a field of the summarized narration to insert a user adjustable parameter that enables manipulation of the underlying recipe and obtain a parameterized summary that includes the user adjustable parameter; and presenting, via a first user interface, the parameterized summary.

Clause 11. The method of clause 10, wherein receiving the data indicative of the summarized narration of the recipe comprises presenting, via a second user interface, a text entry field by which to receive, from a user, text data indicative of the summarized narration of the receipt.

12. The method of claim 11, wherein parameterizing the fields of the summarized narration comprises: receiving, via the second user interface and from the user, a selection of one or more symbols of the text data as the field of the summarized narration; receiving, via the second user interface and from the user, a selection of a field of the recipe; and linking the field of the summarized narration to the field of the recipe to enable the field of the summarized narration to operate as the user adjustable parameter by which the user adjusts the linked field of the recipe.

Clause 13. The method of clause 12, wherein linking the field of the summarized narration to the field of the recipe comprises: determining a data type of the field of the summarized narration; determining a data type of the field of the recipe; determining a compatibility between the data type of the field of the summarized narration and the data type of the field of the recipe; and linking, based on the compatibility, the field of the summarized narration to the field of the recipe.

Clause 14. The method of any combination of clauses 10-13, wherein the field of the summarized narration includes one of a date field, a duration field, and a data analytics field.

Clause 15. The method of any combination of clauses 10-14, wherein parameterizing the fields of the summarized narration comprises: receiving, via a second user interface and from a user, a selection of one or more symbols of the data as the field of the summarized narration; receiving, via the second user interface and from the user, a selection of a field of the recipe; and linking the field of the summarized narration to the field of the recipe to enable the field of the summarized narration to operate of the user adjustable parameter by which the user adjusts the linked field of the recipe.

Clause 16. The method of any combination of clauses 10-15, further comprising: receiving, via the first user interface, a replacement value for the user adjustable parameter that is different than a default value for the user adjustable parameter; and updating the recipe to replace the default value for the user adjustable parameter with the replacement value and obtain an updated recipe.

Clause 17. The method of clause 16, further comprising executing the updated recipe to perform, based on the replacement value, data analysis with respect to the multi-dimensional data.

Clause 18. The device of any combination of clauses 10-17, wherein each of the language sub-surfaces specify a corresponding set of syntax rules and strings permitted for the natural language with which a user may interface to enter the data indicative of the input.

Clause 19. A non-transitory computer-readable storage medium having instructions stored thereon that, when executed, cause one or more processors to: receive a sequence of inputs defining a recipe for analyzing the multi-dimensional data according to a language sub-surface specifying a natural language containment hierarchy defining a grammar for a natural language as a hierarchical arrangement of a plurality of language sub-surfaces; receive data indicative of a summarized narration of the recipe; parameterize a field of the summarized narration to insert a user adjustable parameter that enables manipulation of the underlying recipe and obtain a parameterized summary that includes the user adjustable parameter; and present, via a first user interface, the parameterized summary.

In each of the various instances described above, it should be understood that the devices 12/14 may perform a method or otherwise comprise means to perform each step of the method for which the devices 12/14 is described above as performing. In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the devices 12/14 has been configured to perform.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media. Data storage media may be any available media that can be accessed by one or more computers or one or more processors to retrieve instructions, code and/or data structures for implementation of the techniques described in this disclosure. A computer program product may include a computer-readable medium.

Likewise, in each of the various instances described above, it should be understood that the client device 14 may perform a method or otherwise comprise means to perform each step of the method for which the client device 14 is configured to perform. In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the client device 14 has been configured to perform.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality described herein may be provided within dedicated hardware and/or software modules configured for encoding and decoding or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the techniques have been described. These and other aspects of the techniques are within the scope of the following claims.

What is claimed is:

1. A device configured to perform data analytics, the device comprising:
   a memory configured to store multi-dimensional data; and
   one or more processors configured to:
   receive a sequence of inputs defining a recipe for analyzing the multi-dimensional data according to a language sub-surface specifying a natural language containment hierarchy defining a grammar for a natural language as a hierarchical arrangement of a plurality of language sub-surfaces;
   receive text data including a sequence of symbols indicative of a summarized narration of the recipe;
   parameterize a field of the summarized narration to insert a user adjustable parameter that enables manipulation of the underlying recipe and obtain a parameterized summary that includes the user adjustable parameter, wherein the field of the summarized narration corresponds to a symbol selected from the sequence of symbols;
   present, via a first user interface, the parameterized summary;
   wherein the one or more processors are, when configured to receive the text data including the sequence of symbols indicative of the summarized narration of the recipe, configured to present, via a second user interface, a text entry field by which to receive, from a user, the text data including the sequence of symbols indicative of the summarized narration of the receipt;
   wherein the one or more processors are, when configured to parameterize the fields of the summarized narration, configured to:
   receive, via the second user interface and from the user, a selection of the symbol of the sequence of symbols of the text data as the field of the summarized narration;
   receive, via the second user interface and from the user, a selection of a field of the recipe; and
   link the field of the summarized narration to the field of the recipe to enable the field of the summarized narration to operate as the user adjustable parameter by which the user adjusts the linked field of the recipe.

2. The device of claim 1, wherein the one or more processors are, when configured to link the field of the summarized narration to the field of the recipe, configured to:
   determine a data type of the field of the summarized narration;
   determine a data type of the field of the recipe;
   determine a compatibility between the data type of the field of the summarized narration and the data type of the field of the recipe; and
   link, based on the compatibility, the field of the summarized narration to the field of the recipe.

3. The device of claim 1, wherein the field of the summarized narration includes one of a date field, a duration field, and a data analytics field.

4. The device of claim 1, wherein the one or more processors are, when configured to parameterize the fields of the summarized narration, configured to:
   receive, via a second user interface and from a user, a selection of the symbol of the sequence of symbols of the text data as the field of the summarized narration;
   receive, via the second user interface and from the user, a selection of a field of the recipe; and
   link the field of the summarized narration to the field of the recipe to enable the field of the summarized narration to operate of the user adjustable parameter by which the user adjusts the linked field of the recipe.

5. The device of claim 1, wherein the one or more processors are further configured to:
receive, via the first user interface, a replacement value for the user adjustable parameter that is different than a default value for the user adjustable parameter; and
update the recipe to replace the default value for the user adjustable parameter with the replacement value and obtain an updated recipe.

6. The device of claim 5, wherein the one or more processors are further configured to execute the updated recipe to perform, based on the replacement value, data analysis with respect to the multi-dimensional data.

7. The device of claim 1, wherein each of the language sub-surfaces specify a corresponding set of syntax rules and strings permitted for the natural language with which a user may interface to enter the data indicative of the input.

8. A method for performing data analytics, the method comprising:
receiving a sequence of inputs defining a recipe for analyzing the multi-dimensional data according to a language sub-surface specifying a natural language containment hierarchy defining a grammar for a natural language as a hierarchical arrangement of a plurality of language sub-surfaces;
receiving text data including a sequence of symbols indicative of a summarized narration of the recipe;
parameterizing a field of the summarized narration to insert a user adjustable parameter that enables manipulation of the underlying recipe and obtain a parameterized summary that includes the user adjustable parameter, wherein the field of the summarized narration corresponds to a symbol selected from the sequence of symbols;
presenting, via a first user interface, the parameterized summary;
wherein receiving the text data including the sequence of symbols indicative of the summarized narration of the recipe comprises presenting, via a second user interface, a text entry field by which to receive, from a user, the text data including the sequence of symbols indicative of the summarized narration of the receipt;
wherein parameterizing the fields of the summarized narration comprises:
receiving, via the second user interface and from the user, a selection of the symbol of the sequence of symbols of the text data as the field of the summarized narration;
receiving, via the second user interface and from the user, a selection of a field of the recipe; and
linking the field of the summarized narration to the field of the recipe to enable the field of the summarized narration to operate as the user adjustable parameter by which the user adjusts the linked field of the recipe.

9. The method of claim 8, wherein linking the field of the summarized narration to the field of the recipe comprises:
determining a data type of the field of the summarized narration;
determining a data type of the field of the recipe;
determining a compatibility between the data type of the field of the summarized narration and the data type of the field of the recipe; and
linking, based on the compatibility, the field of the summarized narration to the field of the recipe.

10. The method of claim 8, wherein the field of the summarized narration includes one of a date field, a duration field, and a data analytics field.

11. The method of claim 8, wherein parameterizing the fields of the summarized narration comprises:
receiving, via a second user interface and from a user, a selection of the symbol of the sequence of symbols of the data as the field of the summarized narration;
receiving, via the second user interface and from the user, a selection of a field of the recipe; and
linking the field of the summarized narration to the field of the recipe to enable the field of the summarized narration to operate of the user adjustable parameter by which the user adjusts the linked field of the recipe.

12. The method of claim 8, further comprising:
receiving, via the first user interface, a replacement value for the user adjustable parameter that is different than a default value for the user adjustable parameter; and
updating the recipe to replace the default value for the user adjustable parameter with the replacement value and obtain an updated recipe.

13. The method of claim 12, further comprising executing the updated recipe to perform, based on the replacement value, data analysis with respect to the multi-dimensional data.

14. The device of claim 8, wherein each of the language sub-surfaces specify a corresponding set of syntax rules and strings permitted for the natural language with which a user may interface to enter the data indicative of the input.

15. A non-transitory computer-readable storage medium having instructions stored thereon that, when executed, cause one or more processors to:
receive a sequence of inputs defining a recipe for analyzing the multi-dimensional data according to a language sub-surface specifying a natural language containment hierarchy defining a grammar for a natural language as a hierarchical arrangement of a plurality of language sub-surfaces;
receive text data including a sequence of symbols indicative of a summarized narration of the recipe;
parameterize a field of the summarized narration to insert a user adjustable parameter that enables manipulation of the underlying recipe and obtain a parameterized summary that includes the user adjustable parameter, wherein the field of the summarized narration corresponds to a symbol selected from the sequence of symbols;
present, via a first user interface, the parameterized summary;
wherein the one or more processors are, when configured to receive the text data including the sequence of symbols indicative of the summarized narration of the recipe, configured to present, via a second user interface, a text entry field by which to receive, from a user, the text data including the sequence of symbols indicative of the summarized narration of the receipt;
wherein the one or more processors are, when configured to parameterize the fields of the summarized narration, configured to:
receive, via the second user interface and from the user, a selection of the symbol of the sequence of symbols of the text data as the field of the summarized narration;
receive, via the second user interface and from the user, a selection of a field of the recipe; and
link the field of the summarized narration to the field of the recipe to enable the field of the summarized narration to operate as the user adjustable parameter by which the user adjusts the linked field of the recipe.

* * * * *